United States Patent [19]
Waldhauer

[11] 3,728,649
[45] Apr. 17, 1973

[54] AUTOMATIC EQUALIZER FOR DIGITAL CABLE TRANSMISSION SYSTEMS

[75] Inventor: Frederick Donald Waldhauer, Fair Haven, N.J.

[73] Assignee: Bell Telephone Laboratories, Inc., Murray Hill, N.J.

[22] Filed: Apr. 24, 1972

[21] Appl. No.: 247,147

[52] U.S. Cl. ....................................333/18, 333/28
[51] Int. Cl. ..........................H04b 3/04, H03h 7/16
[58] Field of Search .........................333/18, 19, 28; 328/162–164

[56] References Cited

UNITED STATES PATENTS 3,578,914 5/1971 Simonelli ..........................333/18 X

*Primary Examiner*—Herman Karl Saalbach
*Assistant Examiner*—Marvin Nussbaum
*Attorney*—R. J. Guenther et al.

[57] ABSTRACT

An automatic equalizer for digital cable transmission systems compares the differentiated and peak detected pulse output of a variable equalizer to an output level of a voltage reference source to produce a first control signal. A second control signal is derived from the first control signal and both control signals vary the amount of equalization provided by the variable equalizer to equalize the incoming pulses from a remote station. The relationship of the two control signals enables one signal path of the variable equalizer, which contains three signal paths, to be used alone or in combination with one of the other two signal paths. The other two signal paths provide transfer characteristics which alter the transfer characteristic of the transmission cable such that the effective electrical length of the cable is either increased or decreased and an appropriately equalized pulse output is available from the variable equalizer.

5 Claims, 5 Drawing Figures

BIASING MEANS 118

FLAT GAIN CONTROL CCT. 511

AUTOMATIC EQUALIZER FOR DIGITAL CABLE TRANSMISSION SYSTEMS

BACKGROUND OF THE INVENTION

This invention relates to digital cable transmission systems and, more particularly, to an automatic equalizer for optimum equalization of the transfer characteristics of transmission cables in such systems.

Transmission efficiency of transmission cables is enhanced by direct transmission of unrestricted random data. Unfortunately, prior art arrangements which automatically provide equalization for transmission cable loss are not compatible with an unrestricted or random data format for transmission. For example, a typical arrangement for equalization in the prior art is performed by peak detecting the incoming pulse stream to control the amount of equalization. When data is transmitted in an unrestricted format, intersymbol interference between adjacent signal pulses varies the peak amplitude to such a degree that the requisite amount of equalization cannot be determined by peak detection. Furthermore, variations in the gain of amplifiers in a transmission system alter the amplitude of transmitted pulses and produce changes in the peak amplitude of the incoming signal which give rise to a misequalization of the transmission cable.

In high speed digital transmission systems, intersymbol interference, cable anomalies due to design irregularities, and amplitude variation of the transmitted pulses, all have a deleterious effect upon the shape of the incoming pulses and the peak amplitude of a random pulse stream. In these high speed systems, where equalization is most difficult to provide, it is also more critical. Fortunately, one characteristic of random data transmission signals is affected substantially by misequalization and is also relatively independent of the aforementioned problems. This characteristic is that the peak amplitude of the differentiated incoming pulses is substantially constant after appropriate equalization of the incoming signal. Thus a new automatic equalization arrangement would be highly desirable that is more responsive to the effects of misequalization on the incoming signal than to variations in the transmitted pulse energy caused by the aforementioned problems in digital cable transmission systems.

In certain applications, in which the transmitted signal has greater than two levels, automatic flat gain control can be included in the new automatic equalization arrangement to minimize amplitude variations in the transmitted pulses and to provide better performance. In these applications, two measures of the incoming pulse stream are used, one which is sensitive to variation of effective cable length, and one which is sensitive to variations in the flat gain of the channel. Often the flat gain can be controlled adequately without the necessity of automatic control, but in high speed digital cable repeaters, for example, the stability of operation is increased by automatic flat gain control which reduces maintenance.

SUMMARY OF THE INVENTION

In a first illustrative embodiment of the invention, a variable equalizer receives incoming pulses from a transmission cable. The variable equalizer may be located at any point in the transmission system where equalization is required. The output signal of the variable equalizer is differentiated and then applied to a peak detector in a feedback path of the variable equalizer. The differentiator allows only the slope of the transition of the equalized incoming pulse signal to be applied to the peak detector. The output of the peak detector and a level from a voltage reference source are applied separately to inputs of biasing means. The voltage reference source provides an output voltage which is indicative of the slope of a differentiated incoming pulse after optimum equalization. The biasing means compares the output of the peak detector to the voltage level of the reference and provides a control signal for the variable equalizer. This arrangement takes advantage of a unique characteristic of the incoming signal, which is that the slope between maximum amplitude pulses of opposite polarity remains substantially constant after the incoming signal is equalized, although the other characteristics of the incoming signal do not change as the transmission system operates.

The means for biasing actually produces two control signals to operate the variable equalizer which comprises three signal paths. The two control signals enable the first signal path of the variable equalizer to be used alone or in conjunction with the second or third signal paths. If no equalization is required, the first signal path is used while the two control signals bias the second and third signal paths off. If the transfer characteristic of the transmission cable changes and alters the effective electrical length of the transmission cable, either the second path or the third signal path is used in conjunction with the first signal path depending upon the type of equalization required.

In an alternative embodiment of the invention, flat gain control is used in addition to the equalization arrangement of the first embodiment. The flat gain control is performed by peak detecting the output of a variable gain amplifier which has its input connected to the output of the variable equalizer. The peak detected signal controls the amplification of the variable gain amplifier to correct flat gain variations in the transmission system.

It is a feature of the invention that the differentiator and the peak detector in the feedback path of the variable equalizer produce an output which is compared to the level of a voltage reference to provide equalization free from the deficiencies which are characteristic of the prior art equalizer arrangements.

Another feature of the invention is the means for biasing which produces two control signals that enable the variable equalizer to provide no equalization or equalization for a transmission cable that has an undesirable transfer characteristic.

These and other features of the invention will become more apparent as the following detailed description is read in conjunction with the accompanying drawings.

DETAILED DESCRIPTION

Figure 1:
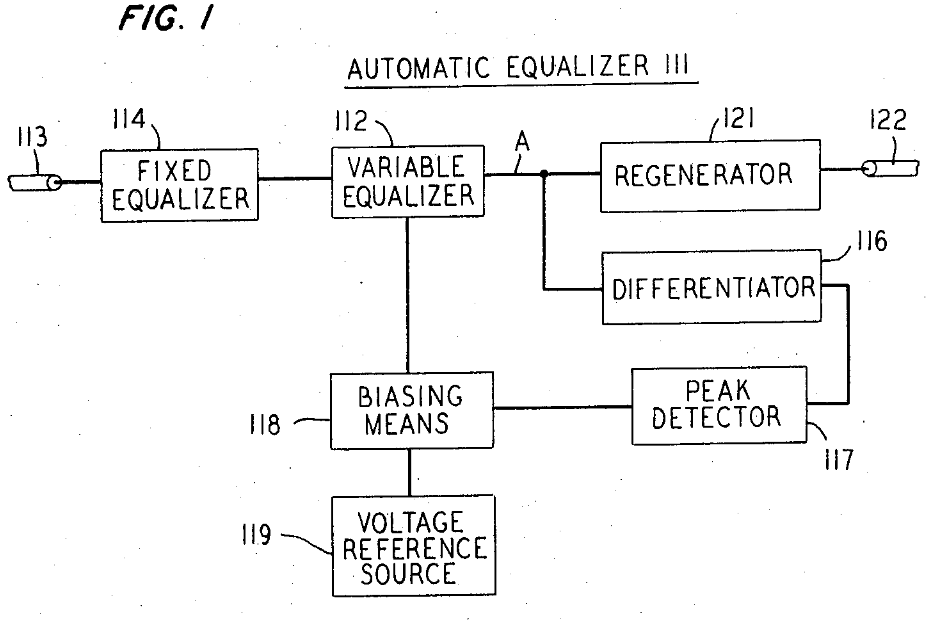
FIG. 1 is a block diagram of an embodiment of the invention.

FIG. 1 is a block diagram of the automatic equalizer 111. The automatic equalizer 111 comprises a variable equalizer 112 which receives incoming pulses from a transmission line 113 through a fixed equalizer 114, a differentiator 116 connected to the output of the variable equalizer 112, a peak detector 117 connected to the output of the differentiator 116, a biasing means 118 connected to the output of the peak detector 117 and a voltage reference source 119, and a regenerator 121 connected from the output of the variable equalizer 112 to the transmission cable 122. The fixed equalizer 114 provides a fixed transfer characteristic which alters the transfer characteristic of the transmission cable 113 at the output of the variable equalizer 114 such that it is within the range of the variable equalizer 112. The peak detector 116 may contain any one of the conventional rectifiers available to those working in the art. Although the invention is shown connected into a repeater station, it should be understood that the invention may readily be used at any location in a cable transmission system where equalization is desired. The operation of the arrangement of FIG. 1 will become apparent from the following discussion of the schematic diagrams of the circuits employed in FIG. 1.

Figure 2:
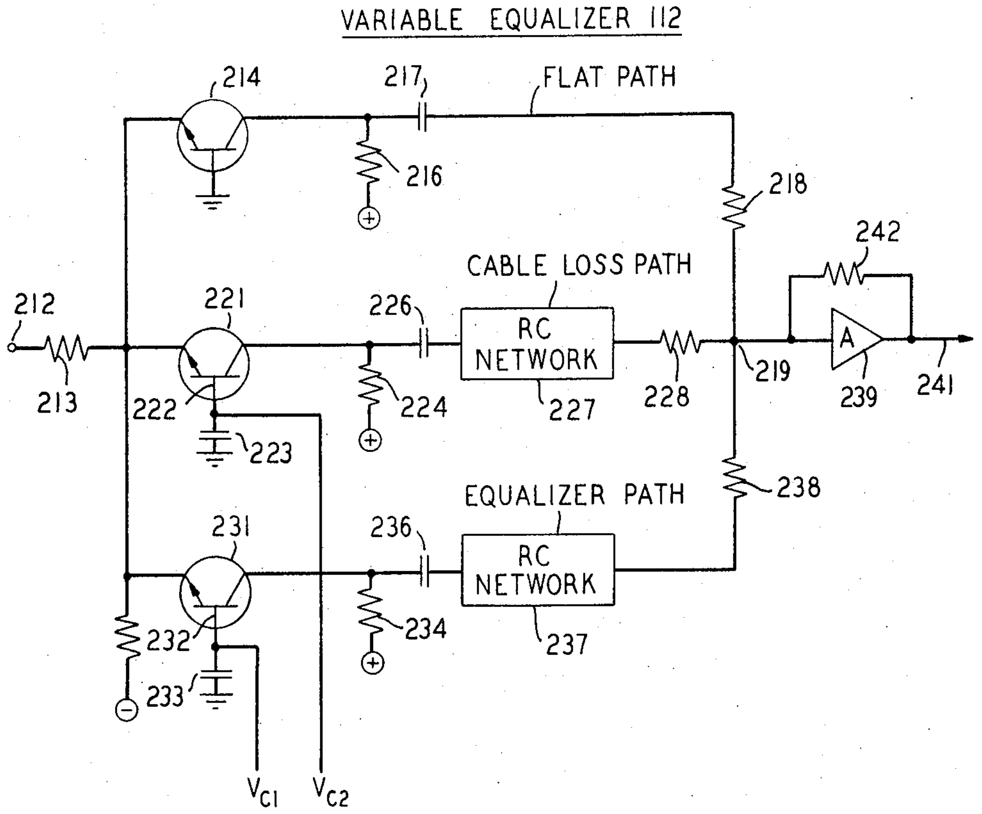
FIG. 2 is a schematic diagram of the variable equalizer utilized in FIG. 1.

FIG. 2 is a schematic diagram of variable equalizer 112. The negative and positive terminals in FIG. 2 are connected, respectively, to negative and positive constant voltage sources not shown in FIG. 2. The output signal of the fixed equalizer 114 of FIG. 1 is applied to the input terminal 212 of the variable equalizer 112. A resistor 213 presents a resistive termination to the input signal. The input signal is applied to the three signal paths of the variable equalizer 112. A transistor 214, in the first signal path (labeled flat path), is connected as a common base amplifier and its collector is biased through a resistor 216 connected to a positive terminal. A coupling capacitor 217 connected from the collector of the transistor 214 to a resistor 218 passes the signal on for application to the summing junction 219. A transistor 221, in the second signal path (cable loss path), is connected as a common base amplifier under the influence of an external bias voltage designated $V_{C2}$. The base 222 of the transistor 221 is bypassed to ground by a capacitor 223. A resistor 224 is connected from the positive terminal to the collector of the transistor 221. A capacitor 226 couples the signal from the collector of the transistor 221 to the RC network 227. The signal passes through the RC network 227 and a resistor 228 and arrives at the summing junction 219. In the third signal path (cable equalizer path), a transistor 231 which is controlled by the application of a bias voltage designated $V_{C1}$ operates as a common base amplifier. The base terminal 232 is bypassed to ground by the capacitor 233. The collector of the transistor 231 is biased through a resistor 234 and the output signal of that transistor is applied to the summing junction 219 through a coupling capacitor 236 and an RC network 237. The RC networks 227 and 237 are designed to equalize transmission cables that have transfer characteristics in which the effective electrical length is too short or too long, respectively. In other words, the cable loss path of the variable equalizer 112 will compensate a transmission cable which is too short electrically and the cable equalizer path of the variable equalizer 112 will compensate a transmission cable which is too long electrically. The signal present at the summing junction 219 is amplified by an amplifier 239 before it is applied to the output terminal 241. A resistor 242 connected from the output terminal 241 to the summing junction 219 provides feedback to control the gain of the amplifier 239. Terminal 241 is connected to the inputs of the differentiator 116 and the regenerator 121.

The variable equalizer 112 supplies a variable amount of equalization depending upon the values of bias voltages $V_{C1}$ and $V_{C2}$. The variable equalizer 211 basically operates in one of three modes. If no equalization is required, bias voltage $V_{C1}$ and $V_{C2}$ have values such that only the transistor 214 is amplifying the input signal. Transistors 221 and 231 in the other signal paths are turned off by the bias voltages $V_{C1}$ and $V_{C2}$. If the transfer characteristic of the transmission cable requires equalization which increases the effective electrical length of the cable, the variable equalizer 211 operates in the second mode. In mode two, transistors 214 and 221 in the first and second signal paths, respectively, are active while the transistor 231 is inactive. Again this is accomplished by adjustment of the values of bias voltages $V_{C1}$ and $V_{C2}$. If equalization of the opposite nature is required, that is, the effective electrical length of the cable should be shortened, transistors 214 and 231 are active while the transistor 221 is inactive. Thus, the first and third signal paths are used to achieve this equalization. The degree of equalization required in modes two and three is obtained by varying the respective portions of signal passed by the first and second signal paths or the first and third signal paths. As either the second or the third signal paths pass larger portions of the input signal with respect to the first signal path, the amount of equalization increases. While the variable equalizer 112 operates in the second and third modes, the signals from the paired signal paths are summed at the junction 219. In all three modes of operation, the signal at junction 219 is applied to the amplifier 239. The output signal of the amplifier 239 is supplied to the terminal 241. The relationship between bias voltages $V_{C1}$ and $V_{C2}$ required to achieve the operation of the variable equalizer 112 shall be explained in the following discussion with reference to FIGS. 3 and 4.

Figure 3:
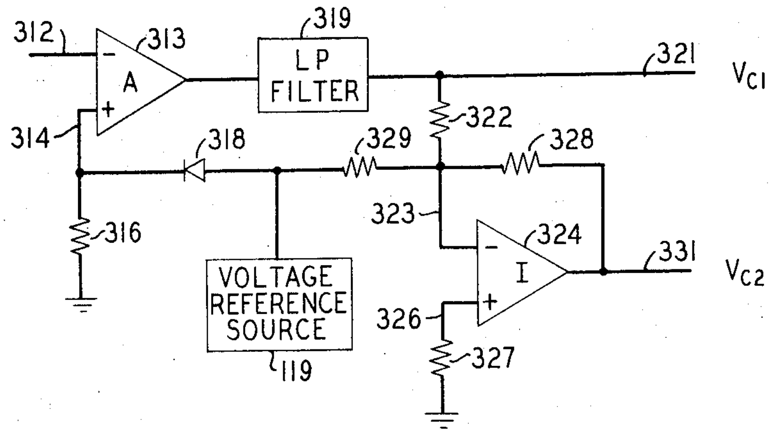
FIG. 3 is a schematic diagram of the peak detector and the biasing means which are utilized to control the variable equalizer of FIG. 1.

FIG. 3 is a schematic diagram of a biasing means 118 which includes the connection of the voltage reference source 119. An input terminal 312, which is the inverting terminal, of an amplifier 313 is connected to the peak detector 117 in FIG. 1. The noninverting terminal 314 is connected to ground through a resistor 316. The terminal 314 is also connected to a voltage reference source 119 through diode 318. The output level of the voltage reference source 119 available at terminal 314 is indicative of the value of the slope of a transmitted pulse through a cable which is equalized to optimum value. The amplifier 313 compares the input signal of terminal 312 to the reference potential on the terminal 314 to provide an output signal. The diode 318 is selected to match the rectifier in the peak detector 117 in FIG. 1 for temperature compensation. The output signal of the amplifier 313 is filtered by a lowpass filter 319 before application to a terminal 321. This voltage on the terminal 321 is designated as $V_{C1}$ and used to bias the base electrode 232 of the transistor 231 of the variable equalizer 112 in FIG. 2. The bias signal $V_{C1}$ is applied through a resistor 322 connected to the inverting terminal 323 of an inverter 324. The noninverting terminal 326 is connected to ground through a resistor 327. A resistor 328 connected from the output terminal 331 to the input terminal 323 of the inverter 324 provides a feedback path. In this instance, the relative values of resistors 322 and 328 are adjusted so that the inverter 324 has unity gain. The input terminal 323 of the inverter 324 is also connected to the voltage reference source 119 through a resistor 329. The output signal of the inverter 324 available on a terminal 331 is designated as $V_{C2}$. This signal biases the base electrode 222 of the transistor 221 of the variable equalizer 112 in FIG. 2.

Figure 4:
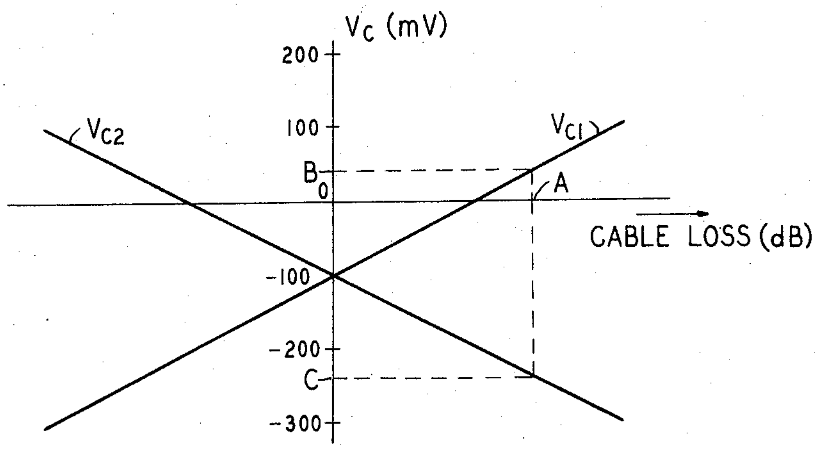
FIG. 4 is the output characteristic of the biasing arrangement used to control the variable equalizer in FIG. 1.

FIG. 4 depicts the relationship between $V_{C1}$ and $V_{C2}$ as a function of cable loss of the transmission cable. The intersection of $V_{C1}$ and $V_{C2}$ in FIG. 4 is produced by the operation of the circuitry which connects the amplifier 313 and the inverter 324 to the voltage reference source 119. Since the inverter 324 has unity gain, the slopes of $V_{C1}$ and $V_{C2}$ have the same magnitude while their signals are opposite. This relationship between $V_{C1}$ and $V_{C2}$ is important to operate the variable equalizer 112 of FIG. 2. For example, if no equalization of the incoming signal is required, the operating point in FIG. 4 is 0 dB. which corresponds to the intersection of $V_{C1}$ and $V_{C2}$. At this point $V_{C1}$ and $V_{C2}$ both have the same negative value and are applied to transistors 231 and 221, respectively. The application of this negative voltage to transistors 221 and 231 turns them off. Thus, the input signal to the variable equalizer 112, which is operating in mode one, is passed solely by the transistor 214 in the first signal path. If the incoming signal requires equalization, which shortens the effective electrical length of the transmission cable, the operating point in FIG. 4 is to the right of the intersection of $V_{C1}$ and $V_{C2}$ on the cable loss abscissa. In this half of FIG. 4, the value of $V_{C1}$ is positive with respect to $V_{C2}$. For example, at a value of cable loss corresponding to point A fixes the values of $V_{C1}$ and $V_{C2}$ at points B and C respectively. The application of these voltages to the variable equalizer 112 causes it to operate in mode three. The quantity of equalization required in this instance determines the distance that the operating point is to the right of 0 dB. If the opposite type of equalization is required, the operating point is to the left of 0 dB. Now the value of $V_{C2}$ is positive with respect to $V_{C1}$ and the variable equalizer 112 in FIG. 2 operates in mode two. The location of the operating point is automatically adjusted by the operation of the invention to yield equalization that is optimum. Since the absolute value of the slope of equalized incoming pulses is fixed by the parameters of the transmission system and is independent of the sequence of the information being transmitted, this is used as the sole criterion to obtain automatic equalization.

Figure 5:
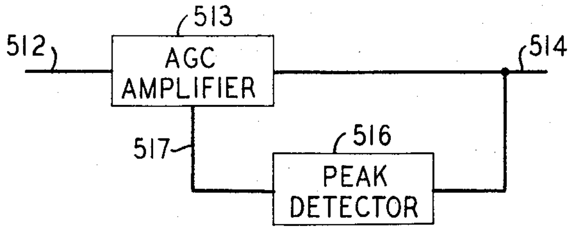
FIG. 5 is a block diagram of an automatic flat gain control circuit which may be incorporated into FIG. 1.

FIG. 5 is a block diagram of a flat gain control circuit 551 which may be included in FIG. 1. The flat gain control circuit 511 can be inserted into the automatic equalizer 111 shown in FIG. 1 at point A. Specifically, the output of the variable equalizer 112 is applied to an input terminal 512 of AGC amplifier 513. The output signal of AGC amplifier 513 from an output terminal 514 is supplied to a peak detector 516 and also to the regenerator 121 and the differentiator 116 in FIG. 1. The peak detector 516 provides a control signal which is applied to AGC amplifier 513 by a conductor 517. The control signal causes the gain of AGC amplifier 513 to vary such that its output signal maintains a substantially constant amplitude. As was mentioned previously, the flat gain control has the ability to enhance the operation of the automatic equalizer 111 of FIG. 1 for multilevel signal applications.

Although the embodiment of the invention has been described in terms of using a three signal path variable equalizer, the principles of the invention are much broader and may be employed in various different embodiments. For example, a larger number of signal paths in the variable equalizer may be utilized. Furthermore, the control signal from the biasing means may be manipulated by circuits which multiply it by itself to generate a variety of control signals which are related by integral powers of the original control signal. Each control signal can be applied to a signal path that contains an RC network which has a transfer characteristic indicative of a term in a power series. The sum of the terms in the power series may be used to represent a transfer characteristic that enables precise equalization of a transmission cable. In addition to the utilization of multiple signal paths, a plurality of variable equalizers may be connected in tandem to obtain a larger range of variable equalization.

In all cases, it is to be understood that the foregoing arrangement is merely illustrative of the many possible applications of the principles of the invention. Numerous and varied other arrangements may readily be devised by those skilled in the art without departing from the spirit and scope of the invention.

What is claimed is:

1. In a cable transmission system, an automatic equalizer comprising:

variable equalizer means for receiving incoming pulses from a cable connected to a remote station;

means for controlling said variable equalizer means to change the effective electrical length of said cable independent of the energy and sequence of the incoming pulses comprising, differentiating means for generating an output indicative of the rate of change in the transitions in the pulse output of said variable equalizer, peak detecting means connected to generate an output proportional to the peak amplitude of the output of said differentiating means, a voltage reference source having an output voltage indicative of the slope of an incoming pulse after being subjected to optimum equalization, and biasing means for comparing the output of said peak detector to the output of said voltage source to vary the equalization of said variable equalizer means.

2. In a cable transmission system the automatic equalizer of claim 1 wherein said variable equalizer means comprises:

a first signal path including an amplifier having an input connected to receive the incoming pulses and an output;

a second signal path including an amplifier having an input connected to receive the incoming pulses and an output connected to an RC network having an output and simulating a cable loss path;

a third signal path including an amplifier having an input connected to receive the incoming pulses and an output connected to an RC network having an output and simulating a cable equalizer path;

summing means to combine the outputs of the said signal paths;

said biasing means varying the gain of said amplifiers to vary the amount of equalization of said variable equalizer means.

3. In a cable transmission system, the automatic equalizer of claim 1 wherein said biasing means comprises a differential amplifier having one input connected to receive the output of said peak detecting means and another connected to receive the output of said voltage reference source;

filtering means being connected to the output of said differential amplifier;

the output of said filtering means being used to vary the equalization of said variable equalizer means.

4. In a cable transmission system, the automatic equalizer of claim 3 wherein said biasing means further comprises an inverter means being connected to receive the output of said filtering means and said voltage reference source to produce an output signal that increases in magnitude as the output signal of said filtering means decreases in magnitude.

5. In a cable transmission system, the automatic equalizer of claim 4 wherein said variable equalizer means comprises:

a first signal path including an amplifier connected to receive the incoming pulses;

a second signal path including an amplifier connected to receive the incoming pulses and to an RC network capable of reducing the effective electrical length of said cable;

a third signal path including an amplifier connected to receive the incoming pulses and to an RC network capable of increasing the effective electrical length of said cable;

summing means to combine the output of each signal path;

the output of said filtering means being connected to control the gain of said amplifier in the second signal path;

the output of said inverting means being connected to control the gain of said amplifier in the third signal path;

and the output characteristic of said filtering means and said inverting means enables the first signal path to be used alone or in combination with either said second or third signal paths.

* * * * *

UNITED STATES PATENT OFFICE
CERTIFICATE OF CORRECTION

Patent No. 3,728,649 Dated April 17, 1973

Inventor(s) Frederick Donald Waldhauer

It is certified that error appears in the above-identified patent and that said Letters Patent are hereby corrected as shown below:

Col. 2, line 19, "do not change" should be --do change--.

Col. 3, line 24, change "116" to --117--.

Col. 4, line 17, change "211" to --112--;
line 26, change "211" to --112--.

Col. 5, line 31, "signals" should be --signs--.

Col. 6, line 2, change "551" to --511--;
line 56, after "equalizer" insert --means--.

Col. 8, line 26, change "enables" to --enabling--.

Signed and sealed this 2nd day of April 1974.

(SEAL)
Attest:

EDWARD M.FLETCHER,JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.